US008593665B2

(12) United States Patent
Ito

(10) Patent No.: US 8,593,665 B2
(45) Date of Patent: Nov. 26, 2013

(54) IMAGE FORMING SYSTEM AND INFORMATION PROCESSING APPARATUS

(75) Inventor: Fumitoshi Ito, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1397 days.

(21) Appl. No.: 11/937,347

(22) Filed: Nov. 8, 2007

(65) Prior Publication Data

US 2008/0259384 A1   Oct. 23, 2008

(30) Foreign Application Priority Data

Dec. 18, 2006  (JP) ................................. 2006-339864

(51) Int. Cl.
*G06F 3/12* (2006.01)
(52) U.S. Cl.
USPC ............ 358/1.15; 358/1.1; 718/102; 718/106
(58) Field of Classification Search
USPC ........................... 358/1.1, 1.15; 718/106, 102
See application file for complete search history.

(56) References Cited

U.S. PATENT DOCUMENTS

| 6,552,813 B2 * | 4/2003 | Yacoub ........................ 358/1.1 |
| 2005/0166184 A1 * | 7/2005 | Takao ........................... 717/117 |

FOREIGN PATENT DOCUMENTS

| JP | H09-311769 A | 12/1997 |
| JP | 2004-287860 A | 10/2004 |
| JP | 2006-246084 A | 9/2006 |

* cited by examiner

*Primary Examiner* — King Poon
*Assistant Examiner* — Lawrence Wills
(74) *Attorney, Agent, or Firm* — Canon U.S.A., Inc., IP Division

(57) ABSTRACT

A system is capable of performing a processing flow based on a definition file which designates a plurality of tasks each of which can be performed by a function provided by an image forming apparatus and an order of performance of a plurality of tasks. The system includes an acquisition unit configured to acquire a definition file of the processing flow specified by a user, a determination unit configured to select one of a plurality of image forming apparatuses to perform each task included in the processing flow based on candidate information included in the definition file of the processing flow, and a performing unit configured to perform each task included in the processing flow using the image forming apparatus selected by the determination unit. The candidate information includes information on a user device that is set corresponding to each user as information for determining the image forming apparatus that performs the task.

8 Claims, 12 Drawing Sheets

FIG.5

| ID (501) | PROCESS FLOW NAME (502) | CREATOR (503) | ACCESSIBLE USER/GROUP (504) | PROCESS FLOW DEFINITION (505) |
|---|---|---|---|---|
| 1 | SEND E-MAIL AND PRINT | UserA | UserA, UserB, ... GroupC | ... |
| 2 | BUSINESS TRIP APPLICATION | UserA | UserA, GroupD | ... |
| 3 | PRINT FILE | UserB | UserA, UserB | ... |
| ... | | | | |

FIG.6

```xml
<?xml version="1.0" encoding="utf-8" ?>
  <Taskflow id="1" caption="SEND E-MAIL AND PRINT" comment="…" date="…">
    <Task type="Scan">                                    ~610
      <ExecuteDevice>
        <Device type="LOCAL" priority="1" />              ~611
      </ExecuteDevice>
      <Setting>....</Setting>
    </Task>
    <Task type="OCR">                                     ~620
      <ExecuteDevice>
        <Device type="LOCAL" priority="1" />              ~621
        <Device type="SPECIFIED" priority="2">            ~622
          <IPADDR>...</IPADDR>
          <MACADDR>...</MACADDR>
        </Device>
      </ExecuteDevice>
      <Setting>....</Setting>
    </Task>
    <Task type="Send">                                    ~630
      <ExecuteDevice>
        <Device type="LOCAL" priority="1" />              ~631
        <Device type="USER_DEFINE" priority="2" />        ~632
        <Device type="SPECIFIED" priority="3">            ~633
          <IPADDR>...</IPADDR>
          <MACADDR>...</MACADDR>
        </Device>
      </ExecuteDevice>
      <Setting>....</Setting>
    </Task>
    <Task type="Print">                                   ~640
      <ExecuteDevice>
        <Device type="USER_DEFINE" priority="1" />        ~641
        <Device type="LOCAL" priority="2" />              ~642
      </ExecuteDevice>
      <Setting>....</Setting>
    </Task>
  </Taskflow>
```

FIG.7
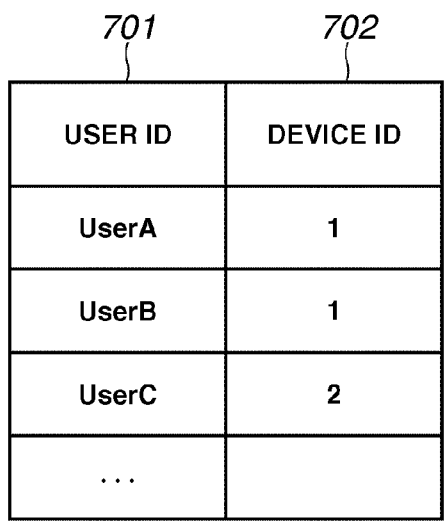
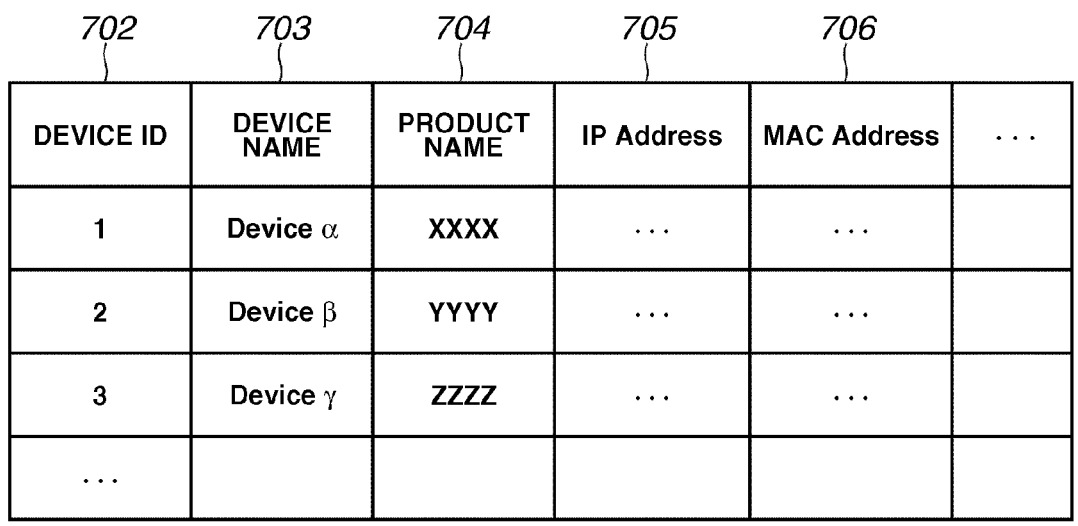

IMAGE FORMING SYSTEM AND INFORMATION PROCESSING APPARATUS

BACKGROUND OF THE INVENTION

1. Field of the Invention

The present invention relates to an image forming apparatus and an image forming system capable of performing a plurality of tasks (e.g., document scanning processing, document data print processing, facsimile transmission processing, e-mail transmission processing, and box storage processing) as a series of processing flows.

2. Description of the Related Art

On a conventional image forming system including a plurality of apparatuses in communication with one another via a network, a user can define a setting for performing a plurality of processing to be performed on document data with the plurality of apparatuses operating in cooperation with one another (a setting for cooperatively performing a plurality of processing). In a conventional image forming method, such a setting for cooperatively performing a plurality of processing can be reutilized by an external apparatus.

Japanese Patent Application Laid-Open No. 2004-287860 discusses a system configured to generate instruction data for cooperatively performing a plurality of processing, which can be reutilized by an external apparatus.

With such a configuration, in which instruction data can be utilized by an external apparatus, instruction data for cooperatively performing a plurality of processing, which has been generated by one user, can be utilized by another user. Thus, it is not necessary for such another user to generate a definition for cooperative processing. In addition, by using a common instruction for performing routine cooperative processing, document processing in a company or an organization can be sharedly performed. Thus, working efficiency can be improved.

However, the above-described configuration has the following problems.

For example, in the case of using a different image forming apparatus that performs a print task for each user who performs cooperative processing, it is necessary to register as many instruction data for cooperatively performing a plurality of processing as the number of users performing cooperative processing.

In addition, in the case where different instruction data is used for each user, it is necessary to modify the instruction data every time a user performs cooperative processing. In this case, an administrator of the system is required to take the trouble of such complicated maintenance operation.

SUMMARY OF THE INVENTION

An embodiment of the present invention is directed to an image forming system including a plurality of image forming apparatuses in which, in using a shared processing flow, the shared processing flow can be flexibly and differently set for each user performing processing and thus a maintenance thereof can be easily performed.

According to an aspect of the present invention, an embodiment is directed to a system for performing a processing flow based on a definition file which designates a plurality of tasks each of which can be performed by a function provided by an image forming apparatus and an order of performing of a plurality of tasks. The system includes an acquisition unit configured to acquire a definition file of the processing flow specified by a user, a determination unit configured to select one of a plurality of image forming apparatuses to perform each task included in the processing flow based on candidate information included in the definition file of the processing flow, and a performing unit configured to perform each task using the image forming apparatus determined by the determination unit, wherein the candidate information includes information on a user device that is set corresponding to each user as information for determining the image forming apparatus that performs the task.

According to another aspect of the present invention, an embodiment is directed to an information processing apparatus configured to generate an instruction for performing a processing flow based on a definition file which designates a plurality of tasks each of which can be performed by a function provided by an image forming apparatus and an order of performance of a plurality of tasks. The information processing apparatus includes an acquisition unit configured to acquire a definition file of the processing flow specified by a user, a determination unit configured to select one of a plurality of image forming apparatuses to perform each task included in the processing flow based on candidate information included in the definition file of the processing flow, and an instruction unit configured to generate an instruction for performing the tasks included in the processing flow to the image forming apparatus selected by the determination unit as an image forming apparatus that is to perform the tasks, wherein the candidate information includes information on a user device that is set corresponding to each user as information for determining the image forming apparatus that performs the task.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 5 illustrates an example of a database management table including processing flow setting files according to an exemplary embodiment of the present invention.

FIG. 6 illustrates an example of a processing flow according to an exemplary embodiment of the present invention.

FIG. 7 illustrates an example of a database management table including information about a user device previously registered for each user according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
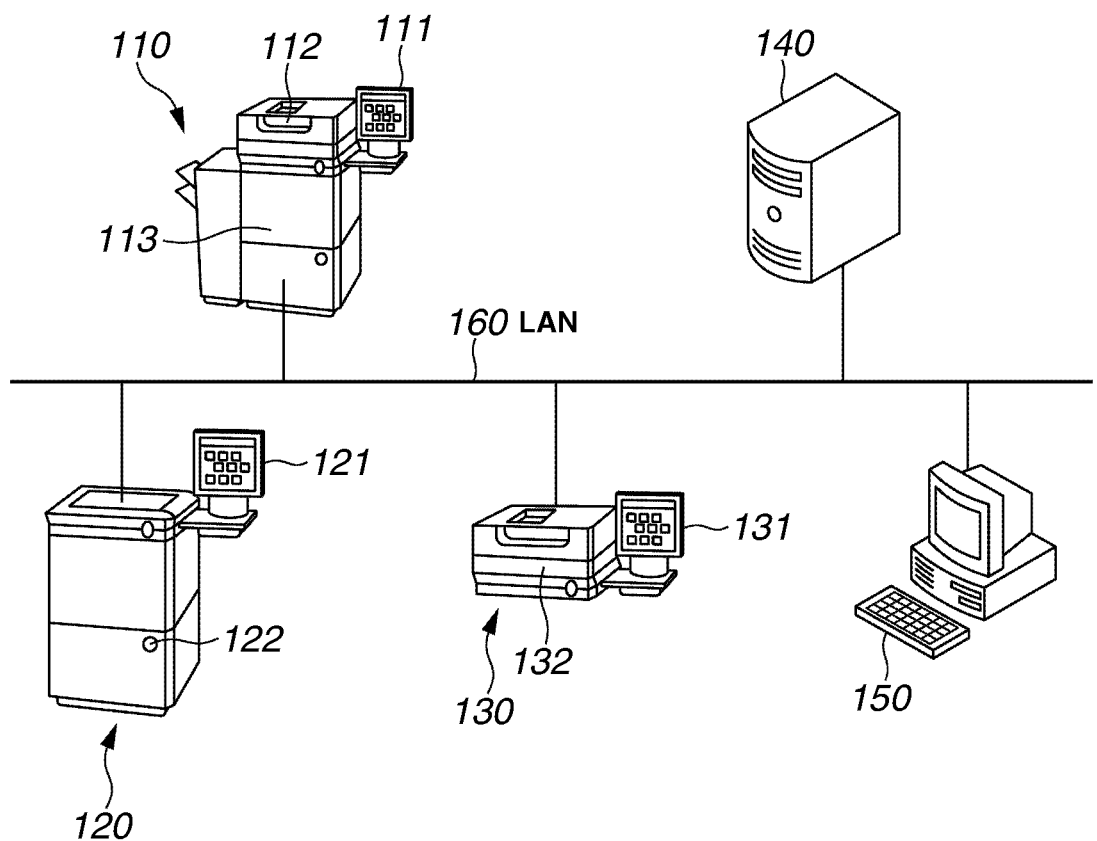
FIG. 1 illustrates an example of a configuration of an image forming system according to an exemplary embodiment of the present invention.

Now, an exemplary embodiment of the present invention will be described below. FIG. 1 illustrates an example of a configuration of an image forming system according to an exemplary embodiment of the present invention.

Referring to FIG. 1, an image forming apparatus (hereinafter sometimes referred to as a "device") 110 is connected to a local area network (LAN) 160 such as Ethernet®. An image forming apparatus 120, which includes no scanner, an image forming apparatus 130, which includes no printer engine, a server computer (hereinafter referred to as a "server") 140, and a client computer (hereinafter referred to as a "client") 150 are connected to the LAN 160.

The apparatuses connected to the LAN 160 in the image forming system according to the present exemplary embodiment is not limited to those described above. Furthermore, in the present exemplary embodiment, the apparatuses are in communication with each other via the LAN 160. However, the present invention is not limited to this. For example, an arbitrary network, such as a wide area network (WAN) (public line), a serial transmission method, such as universal serial bus (USB) and a parallel transmission method, such as Centronics® or small computer systems interface (SCSI), can be used.

The image forming apparatus 110 includes a copy function, a facsimile transmission function, and a data transmission function for reading an image of a document and sending the image data obtained by reading the document to an apparatus on the LAN 160.

In addition, the image forming apparatus 110 includes a page description language (PDL) function. With the PDL function, the image forming apparatus 110 can receive and print a PDL image which has been instructed to be printed from a computer on the LAN 160.

Furthermore, the image forming apparatus 110 can store an image read by the image forming apparatus 110 and a PDL image received and instructed to be printed from a computer on the LAN 160 in a specific area of a hard disk drive 204 of the image forming apparatus 110. Hereinbelow, the specific area of the hard disk drive 204 is referred to as a "box".

Moreover, the image forming apparatus 110 can store an image obtained by reading a document in a box as a digital image. The image forming apparatus 110 can also print the digital image stored in a box.

The image forming apparatus 110 includes a scanner unit 112, which is an image input device, a printer unit 113, which is an image output device, a controller unit (controller) 200 (FIG. 2), which controls the image forming apparatus 110, and an operation unit 111, which is a user interface (UI).

The scanner unit 112 inputs reflection light obtained by exposing and scanning an image of a document into a charge-coupled device (CCD). Thus, the scanner unit 112 converts the obtained image information into an electrical signal. Furthermore, the scanner unit 112 converts the electrical signal into luminance signals including color signals of red (R), green (G), and blue (B), and outputs the luminance signals as image data to the controller 200. The document is placed on a document feeder (not illustrated).

When a user operates the operation unit 111 to start a document reading operation, the controller 200 issues an instruction for reading a document to the scanner unit 112. When receiving the instruction, the scanner unit 112 feeds documents placed on the document feeder sheet by sheet to perform the document reading operation.

For the method for reading a document according to the present exemplary embodiment, in addition to an auto document feed method performed by the document feeder, a method for scanning a document placed on a glass plate (not illustrated) by moving an exposure unit can be used.

The printer unit 113 is an image forming device that forms image data received from the controller 200 on a recording sheet.

In the present exemplary embodiment, an image is formed with an electrophotographic method using a photosensitive drum or a photosensitive belt. However, the present invention is not limited to this. For example, an inkjet image forming method for printing an image on a recording sheet with ink discharged from a minute nozzle array can be used.

The image forming apparatus 120 includes a printer unit 122, which is an image output device, a controller unit (controller) 220 (FIG. 2), which controls the image forming apparatus 120, and an operation unit 121, which is a UI. The printer unit 122 and the operation unit 121 of the image forming apparatus 120 are similar to the printer unit 113 and the operation unit 111 of the image forming apparatus 110.

The image forming apparatus 130 includes a scanner unit 132, which is an image input device, a controller unit (controller) 230 (FIG. 2), which controls the image forming apparatus 130, and an operation unit 131, which is a UI. The scanner unit 132 and the operation unit 131 of the image forming apparatus 130 are similar to the scanner unit 112 and the operation unit 111 of the image forming apparatus 110.

The server 140 executes an operating system (OS) and various application programs with a central processing unit (CPU) of the server 140 and performs processing on various data by executing various application programs on the OS. The same applies to the client 150.

Figure 2:
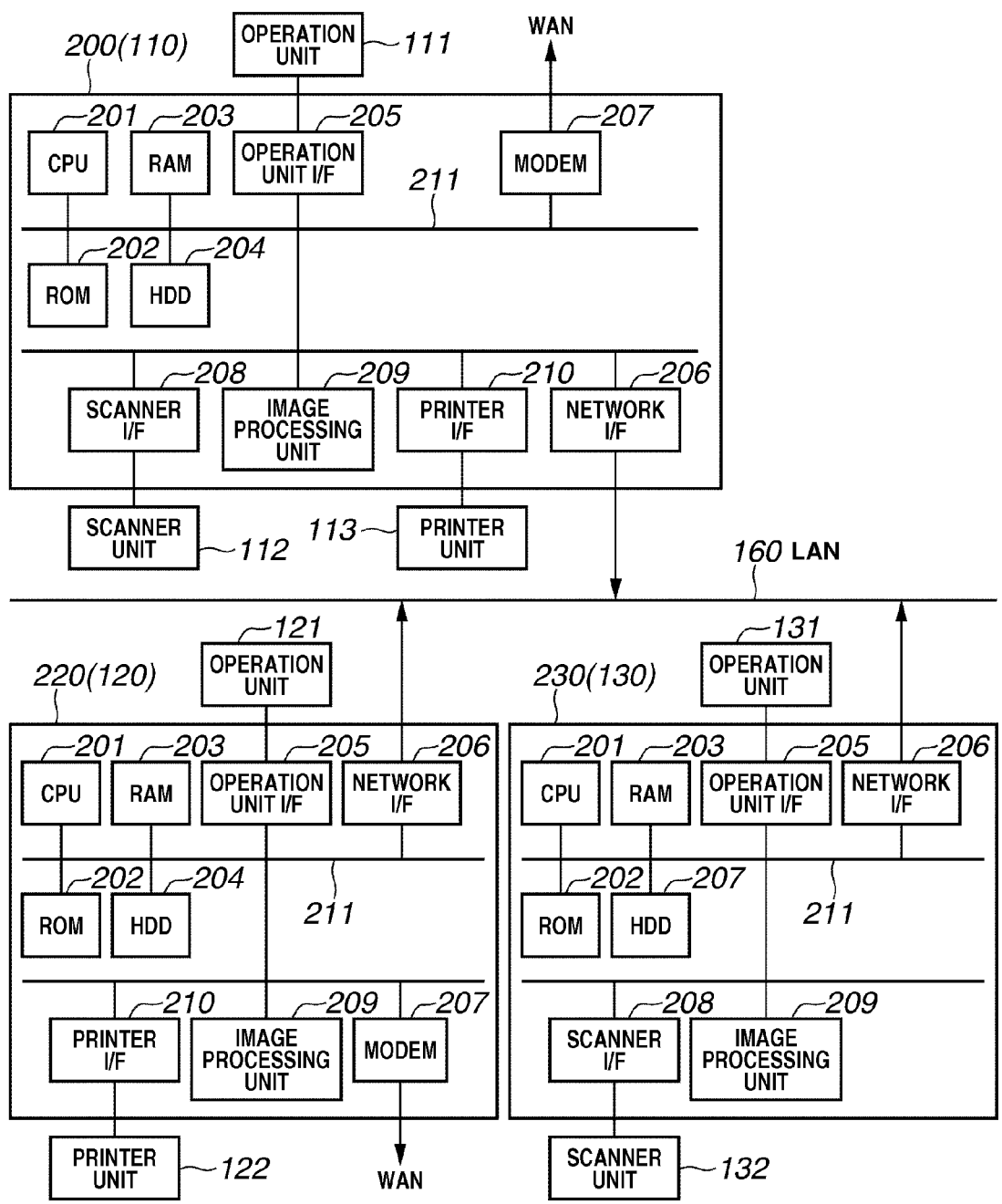
FIG. 2 illustrates an example of a hardware configuration of each of image forming apparatuses according to an exemplary embodiment of the present invention.

FIG. 2 illustrates an example of a hardware configuration of the controller 200 of the image forming apparatus 120, the controller 220 of the image forming apparatus 120, and the controller 230 of the image forming apparatus 130 according to the present exemplary embodiment.

Referring to FIG. 2, the controller 200 is electrically connected to the scanner unit 112 and the printer unit 113, and is also connected to the image forming apparatus 120, the image forming apparatus 130, the server 140, and the client 150 via the LAN 160. Thus, image data and device information can be input and output among the image forming apparatus 110, the image forming apparatus 120, the image forming apparatus 130, the server 140, and the client 150.

A CPU 201 controls an access with various devices currently connected to the image forming apparatus 110, based on a control program stored in a read-only memory (ROM) 202. Furthermore, the CPU 201 controls various processing performed within the controller 200.

The ROM 202 is a boot ROM and stores a boot program for the image forming apparatus 110. The ROM 202 also stores a control program for controlling various processing provided by the image forming apparatus 110.

A random access memory (RAM) 203 serves as a system work memory for the CPU 201 and also serves as an image memory for temporarily storing image data. The RAM 203 includes a static random access memory (SRAM), which can store a stored content even after the image forming apparatus 110 is powered off and a dynamic random access memory (DRAM), which can erase a stored content after the image forming apparatus 110 is powered off. The hard disk drive (HDD) 204 can store system software and image data.

An operation unit interface (I/F) 205 is an interface between the operation unit 111 and a system bus 211. The operation unit I/F 205 receives image data to be displayed on the operation unit 111 via the system bus 211, outputs the received image data to the operation unit 111, and outputs information input by the operation unit 111 to the system bus 211.

A network I/F 206 is an interface between the LAN 160 and the system bus 211 and inputs and outputs information therebetween.

A modem 207 is connected to a WAN (not illustrated) and the system bus 211, and inputs and outputs information therethrough.

A scanner I/F 208 performs various processing, such as correction, processing, and editing, on image data input by the scanner unit 112. The scanner I/F 208 determines whether the received image data is an image of a color document or a monochromatic document. In addition, the scanner I/F 208 determines whether the received image data is an image of a text document or a photograph document. Furthermore, the scanner I/F 208 adds a result of the determination to the image data. The additional information is hereinafter referred to as "attribute data".

An image processing unit 209 changes an orientation of image data, compresses an image, and decompresses a compressed image.

A printer I/F 210 receives image data sent from the image processing unit 209 and performs image forming processing based on the received image data while referring to attribute data added to the received image data. After the image forming processing is performed, the image data is output to the printer unit 113.

A user instruction to the image forming apparatus 110 and a notification of information to a user can be performed via the operation unit 111 or via the client 150 connected to the image forming apparatus 110 via the LAN 160.

The controller 220 of the image forming apparatus 120 has a similar configuration as the configuration of the controller 200 of the image forming apparatus 110 except that the controller 220 does not includes the scanner I/F 208. The controller 230 of the image forming apparatus 130 has a similar configuration as the configuration of the controller 200 of the image forming apparatus 110 except that the controller 230 of the image forming apparatus 130 does not include the printer I/F 210 and the modem 207.

Figure 3:
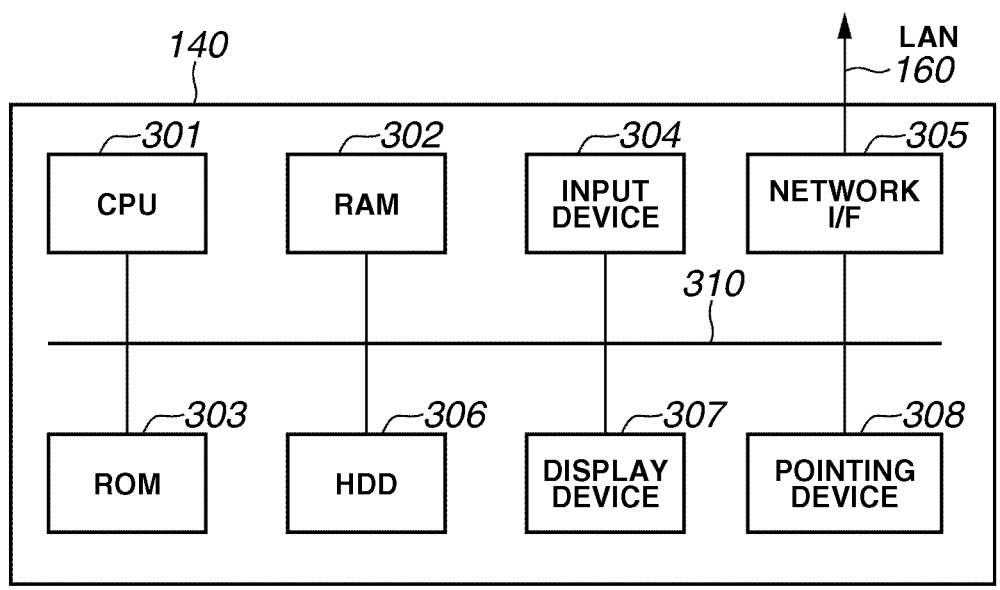
FIG. 3 illustrates an example of a hardware configuration of a server apparatus according to an exemplary embodiment of the present invention.

FIG. 3 illustrates an example of a hardware configuration of the server 140 (FIG. 1) according to an exemplary embodiment.

Referring to FIG. 3, the server 140 includes a CPU 301, a RAM 302, a ROM 303, a network I/F 305, and an HDD 306, which are in communication with one another via a system bus 310.

In addition, a display device 307 such as a cathode ray tube (CRT), an input device 304 such as a keyboard, and a pointing device 308 such as a mouse are in communication with one another via the system bus 310.

The ROM 303 or the HDD 306 previously stores a control program. The CPU 301 reads the control program from the ROM 303 or the HDD 306 and loads the read control program on the RAM 302 to execute a function as a computer.

In addition, the CPU 301 displays various information on a display screen of the display device 307 and receives a user instruction issued via the input device 304 or the pointing device 308. Furthermore, the CPU 301 can communicate with another apparatus on the LAN 160 via the network I/F 305.

The client 150 has a hardware configuration similar to the hardware configuration of the server 140 illustrated in FIG. 3.

Here, in the present exemplary embodiment, terms such as a "task" and a "processing flow" (hereinafter sometimes referred to as a "flow" or as a "job flow") are used.

Term "task" refers to processing that can be implemented by each function of an image forming apparatus that includes a plurality of functions and processing that can be implemented by an application program executed by an information processing apparatus.

For example, a task that can be provided by an image forming apparatus includes document scanning processing, document data print processing, facsimile transmission processing, e-mail transmission processing, and box storage processing (storing data on a hard disk of a print processing apparatus or a hard disk external to the print processing apparatus).

A processing flow refers to a combination of a series of tasks generated to serially perform processing including a plurality of above-described tasks. It is noted that The processing flow can include a task for performing a task with an input of result of another task as a trigger, and can realize a series of processing which combines various functions of the image forming apparatus.

Figure 4:
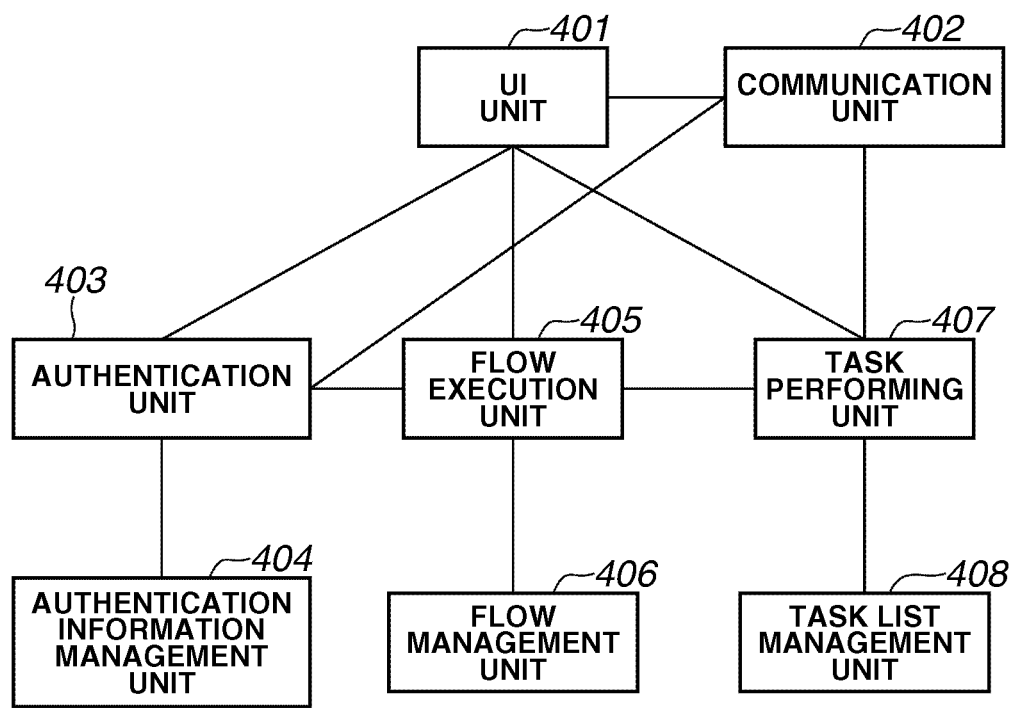
FIG. 4 illustrates an example of a software configuration of an image forming apparatus according to an exemplary embodiment of the present invention.

FIG. 4 illustrates an example of a software module configuration of the image forming apparatus 110 related to a combination of various functions (hereinafter referred to as "tasks") of the image forming apparatus 110 and a control operation for a flow of an order of performing the processing according to the present exemplary embodiment. The CPU 201 executes the functions of the following software modules.

Referring to FIG. 4, a UI unit 401 is a software module for displaying information on the operation unit 111 via the operation unit I/F 205 and performing processing based on a user input via the operation unit 111.

A communication unit 402 is a software module for performing a communication via the network I/F 206 or the modem 207.

An authentication unit 403 is a software module for receiving login information about a user who has logged into the image forming apparatus 110 via the UI unit 401 or user information received from the communication unit 402, performing a user authentication, and managing a user session.

An authentication information management unit 404 is a software module for managing user authentication information and responding to a request for user authentication information from the authentication unit 403. In the present exemplary embodiment, the device (each of the image forming apparatus 110, the image forming apparatus 120, and the image forming apparatus 130) holds the authentication information. However, the authentication information can be managed by a separate authentication server on a network.

A flow execution unit 405 is a software module for analyzing a processing flow setting file. Furthermore, the flow execution unit 405 breaks down a processing flow into task settings for each function (e.g., a scan job setting, a print job setting, and a send job setting).

A flow management unit 406 is a software module for managing a processing flow setting file. In addition, the flow management unit 406 manages information about which processing flow execution button is to be displayed by the operation unit 111 when each user is currently logged in. In the present exemplary embodiment, each description in a processing flow is handled as a file. However, each description of a processing flow can be stored in the RAM 302.

A task performing unit 407 is a software module for generating a task based on various task setting information and performing the generated task.

A task list management unit 408 is a software module for managing a task to be performed.

Various tasks are generated according to a request from the UI unit 401, the communication unit 402, or the flow execution unit 405. For example, when a user has generated an instruction for a copy job or a scan job via the UI unit 401, the UI unit 401 sends a task setting for the copy job or the scan job to the task performing unit 407.

The task setting is registered on the task list management unit 408. The task performing unit 407 serially performs the tasks managed by the task list management unit 408. Similarly, in the case where a task setting is sent from another image forming apparatus or a personal computer (PC) via the communication unit 402, the task performing unit 407 performs the tasks managed by the task list management unit 408.

The operation for performing a processing flow for a user with a cooperative operation of the above-described software modules under control of the CPU 201 will be described in detail below.

FIG. 5 illustrates an example of a database management table including processing flow setting files managed by the server 140 according to an exemplary embodiment.

Referring to FIG. 5, a column 501 indicates a management identification (ID) of a processing flow to be managed. A column 502 indicates a processing flow name. A processing flow name is a character string displayed for identifying each processing flow when a user performs an operation based on a processing flow.

A column 503 indicates an identifier of a creator of a corresponding processing flow. A column 504 indicates information about an accessible user/group range of a processing flow, indicating to which user or group an access right for the processing flow has been granted.

For example, in the case of a processing flow having an ID "1" in FIG. 5, an access right for performing the processing flow has been provided to users identified as "userA" and "userB" and to a user group "groupC".

In the present exemplary embodiment, an access right is granted for each user or user group. However, an access right can be set according to an identifier for each device accessing the server 140 or each network domain.

A column 505 indicates a content of a processing flow definition file. The processing flow definition file will be described in detail below with reference to FIG. 6.

Here, in the present exemplary embodiment, a processing flow definition file is managed with a database, as described above. However, the processing flow definition file can be managed with a general file system.

FIG. 6 illustrates an example of a processing flow definition file used in the system according to an exemplary embodiment. In the present exemplary embodiment, a processing flow definition file is handled as an extensible markup language (XML) file. In the example in FIG. 6, the processing flow definition file includes a description of a processing flow for "send E-mail and print" having an ID "1" (FIG. 5).

A task included in a processing flow is represented as an XML tag. In the present exemplary embodiment, an appearance order of the XML tags corresponds to an order of processing the tasks. In the example in FIG. 6, detailed setting contents for tasks are omitted.

Referring to FIG. 6, a tag 610 indicates an operation for performing a scan task ("Scan") using a scanner unit to input an image.

A tag 611 indicates information on candidate image processing apparatuses for performing the scan task. In the example in FIG. 6, "LOCAL" has been designated, which indicates that an image forming apparatus via which a user has generated an instruction for performing the processing flow is designated as a candidate image forming apparatus for performing the scan task.

A tag 620 indicates an operation for performing an optical character recognition (OCR) task on the input image with software.

Tags 621 and 622 each indicate information on a candidate image forming apparatus that performs the OCR task ("OCR"). In the example in FIG. 6, the candidate image forming apparatuses that perform the OCR task are described in an order of priority of an image forming apparatus via which the user has generated an instruction for performing the processing flow ("LOCAL") and an image forming apparatus designated based on an Internet protocol (IP) address and a media access control (MAC) address ("SPECIFIED").

Which of the image forming apparatuses is to actually perform the OCR task is determined when the processing flow is performed. The processing for determining which of the image forming apparatuses is to actually perform the OCR task will be described in detail below.

A tag 630 indicates an operation for performing a send task ("Send") on the image. Tags 631, 632, and 633 each indicate candidate image forming apparatus for performing the send task.

In the example in FIG. 6, the priority has been designated in the order of an image forming apparatus via which the user has generated an instruction for performing the processing flow ("LOCAL"), a user device ("USER_DEFINE"), and a specified image forming apparatus ("SPECIFIED").

Here, the user device refers to an image forming apparatus that has been previously registered so that each user can use as a default setting. The user device will be described in detail below with reference to FIG. 7.

In the present exemplary embodiment, the specified image forming apparatus refers to the one specified based on an IP address and a MAC address. However, the specified image forming apparatus can be specified based on a device name or a host name of an image forming apparatus instead of using an IP address and a MAC address as described above.

A tag 640 indicates an operation for performing a print task ("Print") on the image. Tags 641, 642, and 643 each indicate a candidate image forming apparatus for performing the print task.

In the example in FIG. 6, the candidate image forming apparatuses for performing the print task are designated in an order of priority of a user device ("USER_DEFINE") and an image forming apparatus via which the user has generated an instruction for performing the processing flow ("LOCAL").

In the present exemplary embodiment, the candidate image forming apparatuses for performing the task described in the processing flow can be specified in three different ways. However, the present invention is not limited to this. That is, an arbitrary image forming apparatus that can perform the task, which has been extracted as a result of a search for an image forming apparatus on the network during performing the processing flow, can be specified as a candidate image forming apparatus.

In the present exemplary embodiment, the processing flow definition file is an XML file. However, the processing flow definition file can be defined according to an arbitrary protocol or format.

FIG. 7 illustrates an example of a database management table including information on a user device previously registered for each user and managed by the server 140 according to an exemplary embodiment.

Referring to FIG. 7, a column 701 indicates a user ID. The user ID is uniquely provided to the corresponding user in the system for identifying each user. A column 702 indicates a device ID for an image forming apparatus provided in relation to the user. The device ID is uniquely provided to an image forming apparatus within the system.

A column 703 indicates a device name. A column 704 indicates a product name of the device. A column 705 indicates an IP address allocated to an image forming apparatus. A column 706 indicates a MAC address of a network card installed on an image forming apparatus.

With the table having the above-described configuration, the user device can be associated with the user.

In the present exemplary embodiment, a "device α" having the device ID "1" (FIG. 5) has been set as the user device with respect to the user A and the user B. A device β having the device ID "2" (FIG. 5) has been set as the user device for a user C. As described above, the same image forming apparatus can be registered as an image forming apparatus to be used as a default device for different users.

In the present exemplary embodiment, one image forming apparatus is defined as the user device used by one user as a default device. However, a plurality of user devices can be defined as user devices for one user. Furthermore, a department or an organization (company) itself can be specified as the user.

In the present exemplary embodiment, a user device is set for each user to set an image forming apparatus that the user frequently uses. For example, a user may generally desire to print out a document with an image forming apparatus located close to a user's seat. However, in the case where an image forming apparatus located close to a user's seat does not include a BOX function or a SEND function, it is necessary for the user to move to a location of an image forming apparatus located distant from a user's seat.

In the present exemplary embodiment, a plurality of image forming apparatuses operates in cooperation with one another to execute a cooperative function or processing. Accordingly, a user can generate an instruction for performing a processing flow without taking the trouble of moving to a distant image forming apparatus.

Thus, the user can specify an image forming apparatus (user device) located close to a user's seat as a candidate information of an image forming apparatus which performs a final output of the processing flow. Accordingly, the user can immediately obtain a print product.

On the other hand, the ability to perform a scan task using an image forming apparatus, which is located close to the user in generating an instruction for performing a processing flow, is convenient. Therefore, the user can specify, as candidate information, an image forming apparatus via which the user has generated as instruction for performing a processing flow. However, the present invention is not limited to this. That is, a scan task can be performed by an image forming apparatus other than the image forming apparatus via which the user has generated an instruction for performing a processing flow.

In this case, information about an information processing apparatus that performs the scan task can be displayed on an operation panel of the image forming apparatus that performs the scan task and the image forming apparatus via which the user has generated an instruction for performing the scan task.

Since there is a case where an administrator, who has generated a processing flow, wants to make a specific task processed with a specific image forming apparatus, the image forming apparatus ("SPECIFIED") can be specified using the IP address and the MAC as candidate information.

This configuration is useful in the case of processing that is confidential in terms of data security or facsimile transmission processing, which cannot be performed by another apparatus, for which the administrator previously performs a unique setting.

Now, processing for actually performing a processing flow by a user with the image forming apparatus 110 will be described below.

The user performs login processing by entering a user name and a password via a login screen displayed on the operation unit 111.

In the present exemplary embodiment, the user is authenticated based on a user name and a password entered by the user as a character string. However, the user can be authenticated based on information stored on an integrated circuit (IC) card or biometric information of the user. The UI unit 401 sends received authentication information to the authentication unit 403 to authenticate the user.

If the user is successfully authenticated, then the operation unit 111 displays a UI screen for operating the image forming apparatus 110.

Figure 8:
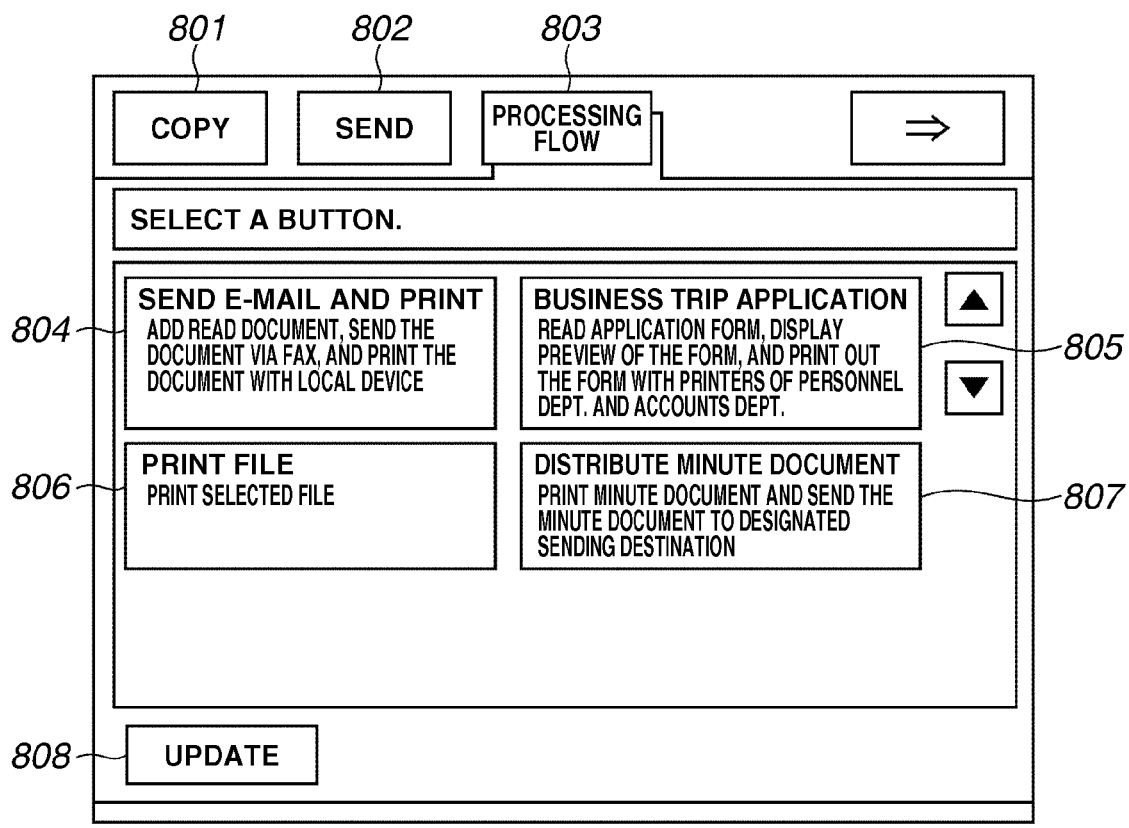
FIG. 8 illustrates an example of a processing flow performing screen according to an exemplary embodiment of the present invention.

FIG. 8 illustrates an example of a screen displayed on the operation unit 111 for allowing a user to generate an instruction for performing a processing flow according to an exemplary embodiment.

Referring to FIG. 8, buttons 801, 802, and 803 can be operated by the user to issue an instruction for changing an application on the image forming apparatus 110. The copy button 801 can be operated by the user to issue an instruction for displaying a screen for a copy application. The send button 802 can be operated by the user to issue an instruction for displaying a screen for a send application. The processing flow button 803 can be operated by the user to issue an instruction for displaying a screen of an application for performing a processing flow (hereinafter referred to as a "processing flow application"). In the example in FIG. 8, the user has pressed the processing flow button 803 and, thus, the screen for the processing flow application is displayed.

Buttons 804, 805, 806, and 807 can be operated by the user to issue an instruction for calling and performing the processing flow displayed on the processing flow application screen. The buttons 804 through 807 are a list of processing flows previously registered on the server 140 that the user can use. The processing for acquiring the list from the server 140 will be described below.

A button 808 can be operated by the user to issue an instruction for updating processing flows stored in the server 140. When the user presses the button 808, the CPU 201 acquires a list of processing flows that the user can perform from the server 140.

Figure 9:
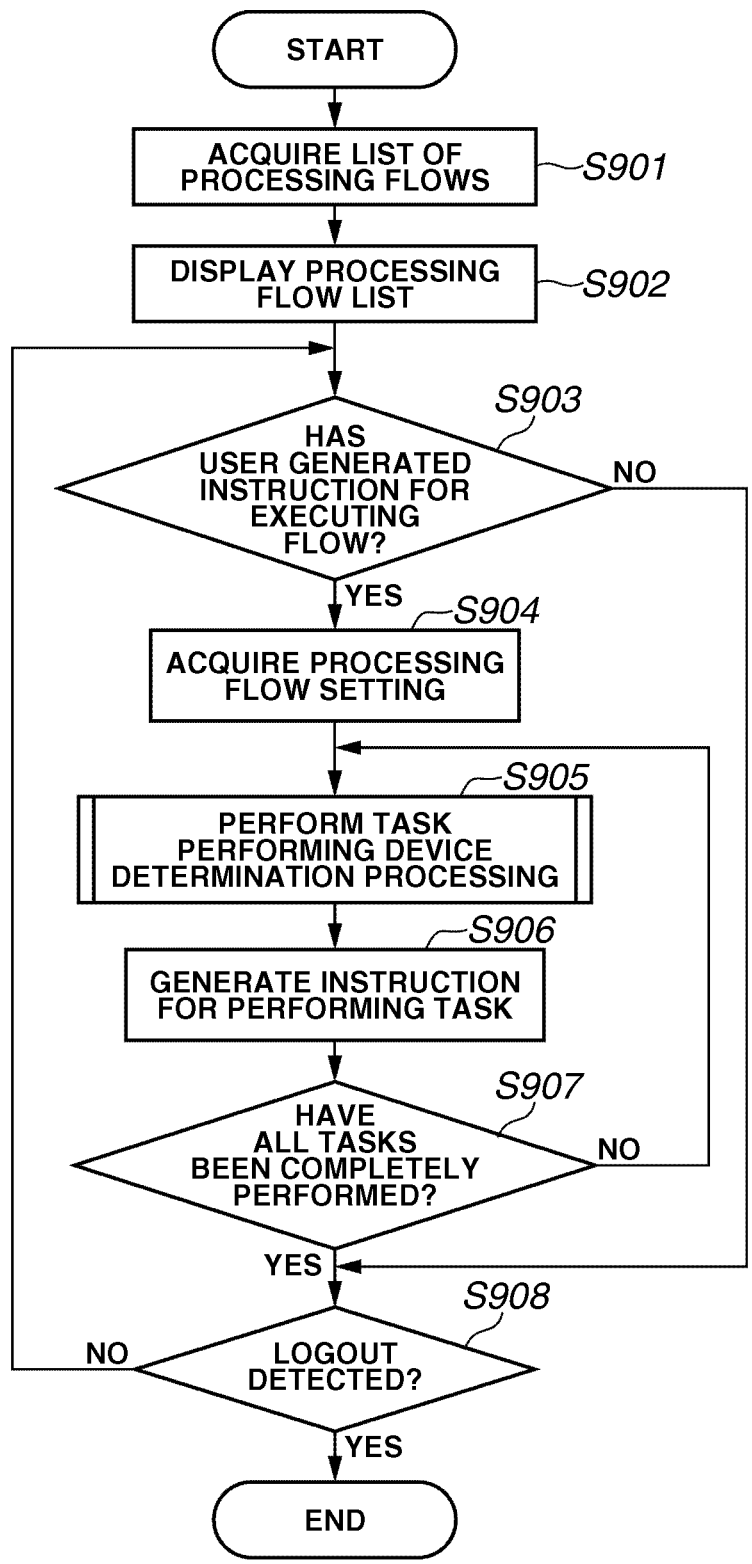
FIG. 9 is a flow chart illustrating an example of processing for performing a processing flow performed with a CPU of an image forming apparatus based on a control program according to an exemplary embodiment of the present invention.

FIG. 9 is a flow chart illustrating an example of processing for performing a processing flow with the CPU 201 of the image forming apparatus 110 based on a control program according to an exemplary embodiment. When the user performs login processing via the operation unit 111 of the image forming apparatus 110, the processing in the flow illustrated in FIG. 9 starts.

Referring to FIG. 9, in step S901, the flow execution unit 405 receives authentication information about the login user from the authentication unit 403, and generates a request to the server 140 via the communication unit 402 for a list of processing flows that the login user can view and use. The processing performed by the server 140 at this time will be described in detail below.

In step S902, the CPU 201 of the image forming apparatus instructs the operation unit 111 to display the processing flow list received from the server 140. On the other hand, if the user has not been successfully authenticated or if no processing flow for which the user has an access right has been extracted, a button for performing a processing flow is not displayed.

In step S903, the CPU 201 of the image forming apparatus receives an event of pressing a button included in the operation unit 111 by the user. If it is determined that the user has pressed a processing flow button displayed on the operation unit 111, then the UI unit 401 issues to the flow execution unit 405 a notification about which processing flow has been instructed to be performed. Then, the CPU 201 advances to step S904. On the other hand, if it is determined that any processing flow button has not been pressed by the user, then the CPU 201 advances to step S908.

In step S904, the flow execution unit 405 acquires a setting for the processing flow. More specifically, the flow execution unit 405 acquires a processing flow definition file for the processing flow corresponding to the button pressed by the user from the flow management unit 406, analyzes the processing flow, and divides the processing flow into tasks. However, the present invention is not limited to this. The flow execution unit 405 can directly acquire the processing flow definition file for the processing flow from an external flow management server.

In step S905, the CPU 201 determines which image forming apparatus is selected to perform the task analyzed in step S904, in order from the first task to the last task. The processing for determining which image forming apparatus is selected to perform the task analyzed in step S904 will be described in detail below.

In step S906, the CPU 201 generates an instruction for performing a task and sends the instruction to the image forming apparatus that is selected to perform the task, determined in step S905. In the case where the image forming apparatus that performs the task is the same as the image forming apparatus that has been instructed to execute the processing flow, the task setting is registered on the task performing unit 407. Then, the image forming apparatus performs the tasks. When the task is completely performed, the CPU 201 notifies a result of performing the task to the task performing unit 407.

In the case where the image forming apparatus that is selected to perform the task is different from the image forming apparatus that has been instructed to execute the processing flow, the flow execution unit 405 sends the setting for the tasks including information about a result notification destination and the authentication information to the image forming apparatus that is selected to perform the task via the communication unit 402.

For example, in the case where the image forming apparatus that is selected to perform a print task is the image forming apparatus 120, the flow execution unit 405 sends the print setting set on the image forming apparatus 110, which has been instructed to execute the processing flow, and the authentication information of the login user to the communication unit 402 of the image forming apparatus 120.

The communication unit 402 of the image forming apparatus 120 performs a user authentication based on the authentication information with the authentication unit 403 of the image forming apparatus 120. If the user is successfully authenticated, the CPU 201 transfers the print setting to the task performing unit 407.

The task performing unit 407 registers the print setting on the task list management unit 408, and then serially performs the tasks. Then, the task performing unit 407 sends a result of performing the tasks to the image forming apparatus 110.

Thus, the image forming apparatus 110 can recognize that the task has been completely performed according to the request generated by the task performing unit 407 to the external apparatus.

In step S907, the flow execution unit 405 determines whether all of the tasks have been completely performed, based on a status of sending a result of performing the tasks notified to the task performing unit 407.

If it is determined in step S907 that all of the tasks included in the processing flow have been completely performed (YES in step S907), then the CPU 201 notifies a message to the user that the processing flow has been completed on a screen of an operation panel of the image forming apparatus that has been instructed to execute the processing flow.

Alternatively, in the case where the processing flow includes a print task and the final output destination apparatus is different from the image forming apparatus that has been instructed to execute the processing flow, a message notifying the completion of the processing flow can be displayed on a screen of an operation panel of the final output destination image forming apparatus. Then, the processing advances to step S908.

On the other hand, if it is determined in step S907 that not all of the tasks included in the processing flow have been completely performed (NO in step S907), then the CPU 201 advances to step S905. In step S905, the CPU 201 determines an image forming apparatus that performs the next task.

In step S908, the CPU 201 determines whether an instruction for logging out has been received from the user.

If it is determined in step S908 that the user has pressed a logout button (not illustrated) or if no user operation is performed during a predetermined period of time (YES in step S908), then the CPU 201 performs the logout processing, and then ends the processing. On the other hand, if it is determined in step S908 that the user has not pressed the logout button, the CPU 201 returns to step S903. In step S903, the CPU 201 waits for an instruction for executing a processing flow by a user.

As described above, the image forming apparatus 110 executes a processing flow.

Now, the processing for determining an image forming apparatus that performs a task performed in step S905 will be described below.

Figure 10:
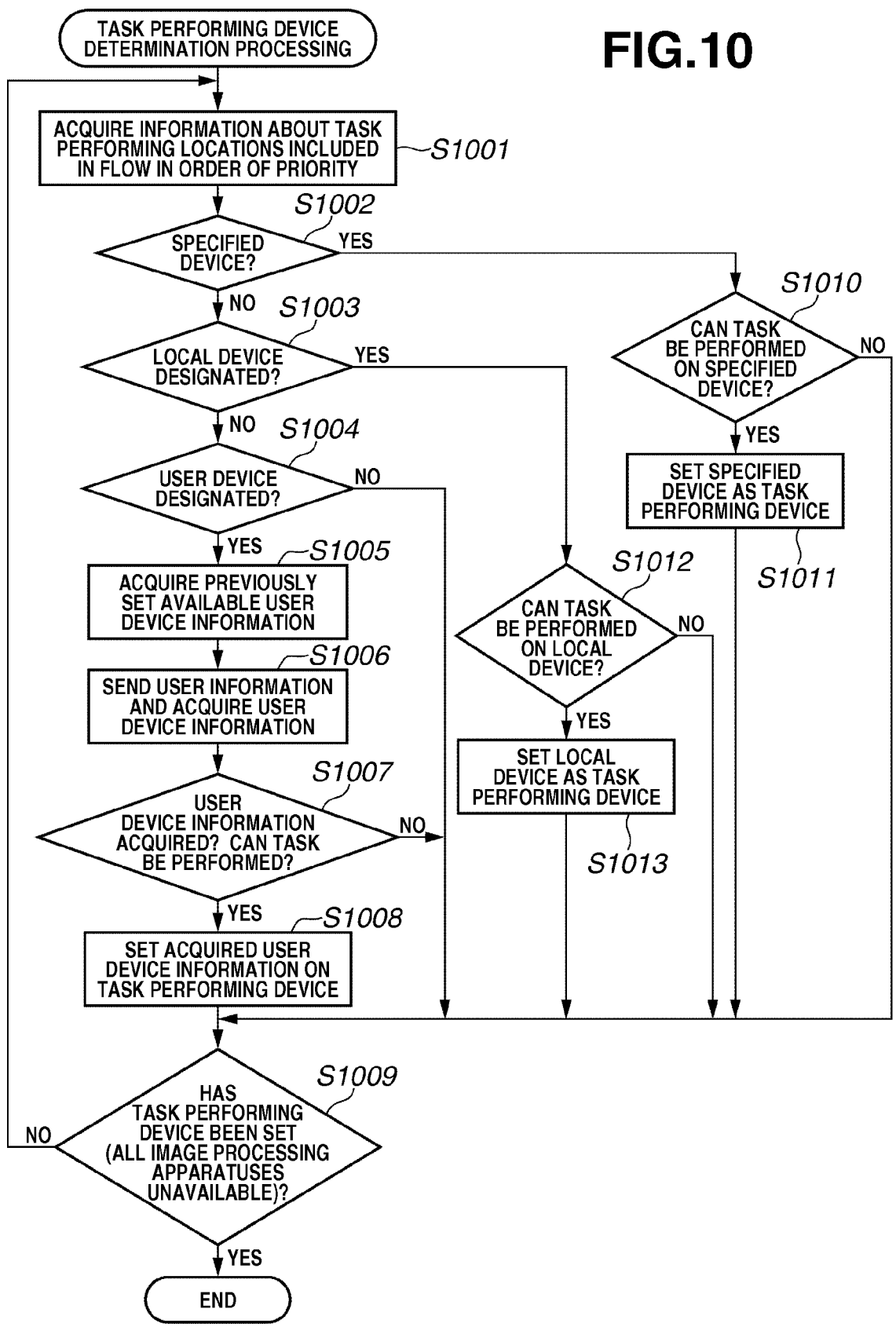
FIG. 10 is a flow chart illustrating an example of processing for determining a device that performs tasks performed with a CPU of an image forming apparatus based on a control program according to an exemplary embodiment of the present invention.

FIG. 10 is a flow chart illustrating an example of processing for determining a device that performs a task performed with the CPU 201 of the image forming apparatus 110 based on a control program according to an exemplary embodiment.

Referring to FIG. 10, in step S1001, the CPU 201 acquires information regarding candidate image forming apparatuses that can perform a task included in a processing flow in order of priority.

In step S1002, the CPU 201 determines whether the candidate image forming apparatus acquired in step S1001 is a specified image processing apparatus. In the example in FIG. 6, descriptions 622 and 633 correspond to a specified image processing apparatus. If it is determined in step S1002 that the candidate image forming apparatus acquired in step S1001 is a specified image processing apparatus (YES in step S1002), then the CPU 201 advances to step S1010. On the other hand, if it is determined in step S1002 that the candidate image forming apparatus acquired in step S1001 is not a specified image processing apparatus (NO in step S1002), then the CPU 201 advances to step S1003.

In step S1003, the CPU 201 determines whether the candidate image forming apparatus acquired in step S1001 is an image forming apparatus via which the user has generated an instruction for executing the processing flow. In the example in FIG. 6, descriptions 611, 621, 631, and 642 correspond to an image forming apparatus via which the user has generated an instruction for executing the processing flow.

If it is determined in step S1003 that the candidate image forming apparatus acquired in step S1001 is an image forming apparatus via which the user has generated an instruction for executing the processing flow (YES in step S1003), then the CPU 201 advances to step S1012. On the other hand, if it is determined in step S1003 that the candidate image forming apparatus acquired in step S1001 is not an image forming apparatus via which the user has generated an instruction for executing the processing flow (NO in step S1003), then the CPU 201 advances to step S1004.

In step S1004, the CPU 201 determines whether the candidate image forming apparatus acquired in step S1001 is a user device. In the example in FIG. 6, descriptions 632 and 641 correspond to a user device.

If it is determined in step S1004 that the candidate image forming apparatus acquired in step S1001 is a user device (YES in step S1004), then the CPU 201 advances to step S1005. On the other hand, if it is determined in step S1004 that the candidate image forming apparatus acquired in step S1001 is not a user device (NO in step S1004), then the CPU 201 advances to step S1009.

In step S1005, the CPU 201 acquires information about available user devices previously set on the image forming apparatus 110. In the present exemplary embodiment, the CPU 201 generates a request for a user device to the server 140.

In step S1006, the CPU 201 generates a request for a user device to the server 140. The processing for searching for a user device performed by the server 140 will be described in detail below.

In step S1007, the CPU 201 determines whether the user device has been acquired and whether the task to be performed can be performed by the acquired image forming apparatus, as a response to the request in step S1006.

The determination as to whether the task can be performed can be made based on information about an image forming apparatus acquired from the server 140. Alternatively, the CPU 201 can generate a request for information as to whether an image forming apparatus having the acquired IP address has a capacity for performing the task to perform the determination as to whether the tasks can be performed.

If it is determined in step S1007 that the acquired user device can perform the task (YES in step S1007), then the CPU 201 advances to step S1008. On the other hand, if it is determined in step S1007 that the acquired user device cannot perform the task (NO in step S1007), then the CPU 201 advances to step S1009.

In step S1008, the CPU 201 sets the user device acquired from the server 140 ("USER_DEFINE") as an image forming apparatus that performs the task.

In step S1009, the CPU 201 determines whether an image forming apparatus that performs the task has been set.

If it is determined in step S1009 that an image forming apparatus that performs the task has been set (YES in step S1009), then the CPU 201 ends the processing. On the other hand, if it is determined in step S1009 that an image forming apparatus that performs the task has not been set (NO in step S1009), then the CPU 201 returns to step S1001 to check for a candidate image forming apparatus having the next highest priority. If it is determined in step S1007 that none of the candidate image forming apparatuses can perform the task (YES in step S1007), then the CPU 201 sends error information and then ends the processing.

In step S1010, the CPU 201 determines whether the task to be performed can be performed by the specified device. The determination as to whether the task can be performed is made in a similar manner as in step S1007. If it is determined in step S1010 that the task can be performed by the specified device, which is a specified image forming apparatus described in the processing flow (YES in step S1010), then the CPU 201 advances to step S1011. On the other hand, if it is determined in step S1010 that the task cannot be performed by the specified device, which is a specified image forming apparatus described in the processing flow (NO in step S1010), then the CPU 201 advances to step S1009.

In step S1011, the CPU 201 sets the specified device ("SPECIFIED") described in the processing flow as an image forming apparatus that performs the task.

In step S1012, the CPU 201 determines whether the task to be performed can be performed by the image forming apparatus via which the user has generated an instruction for performing the processing flow.

If it is determined in step S1012 that the task to be performed can be performed by the image forming apparatus via which the user has generated an instruction for performing the processing flow (YES in step S1012), then the CPU 201 advances to step S1013. On the other hand, if it is determined in step S1012 that the task to be performed cannot be performed by the image forming apparatus via which the user has generated an instruction for performing the processing flow (NO in step S1012), then the CPU 201 advances to step S1009.

In step S1013, the CPU 201 sets the image forming apparatus ("LOCAL") via which the user has generated an instruction for performing the processing flow as an image forming apparatus that performs the task.

The processing for determining an image forming apparatus that performs the task is performed as described above.

Figure 11:
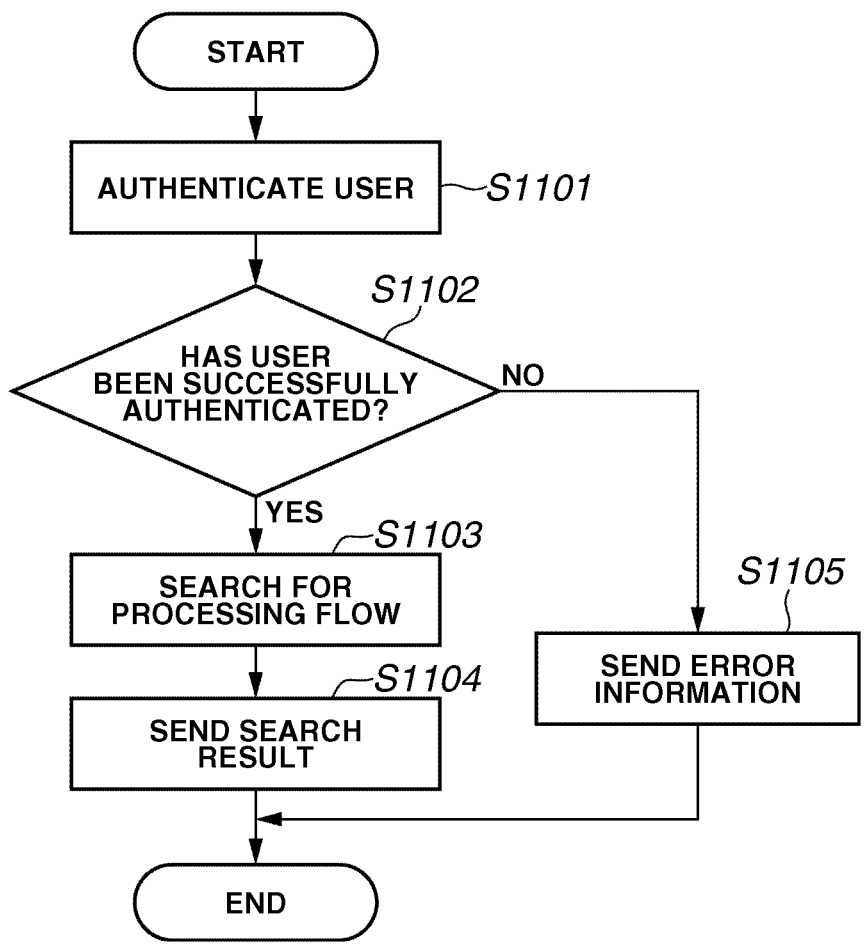
FIG. 11 is a flow chart illustrating an example of processing flow searching processing performed with a CPU of a server based on a control program according to an exemplary embodiment of the present invention.

FIG. 11 is a flow chart illustrating an example of processing flow searching processing performed with a CPU of a processing flow server 140 based a the control program according to an exemplary embodiment. In the present exemplary embodiment, the server 140 serves as the processing flow server. When the image forming apparatus 110 generates a request for a list of processing flows to the server 140 in step S902 in FIG. 9, the processing flow searching processing is performed.

Referring to FIG. 11, in step S1101, the CPU 301 of the server 140 performs a user authentication based on the user authentication information included in the request for a list of processing flows.

In step S1102, the CPU 301 determines whether the user has been successfully authenticated. If it is determined in step S1102 that the user has been successfully authenticated (YES in step S1102), then the CPU 301 advances to step S1103. On the other hand, if it is determined in step S1102 that the user has not been successfully authenticated (NO in step S1102), then the CPU 301 advances to step S1105.

In step S1103, the CPU 301 searches for a processing flow that the authenticated user can view and use from the database in the server 140. For example, in the case where the user A (FIG. 5) has been authenticated, a processing flow in which an access right is provided to the user A and a user group to which the user A belongs is searched for.

In step S1104, the CPU 301 sends the processing flow searched for in step S1103 to the image forming apparatus that has generated the request. Then, the processing ends.

In step S1105, the CPU 301 sends error information indicating that the user has not been successfully authenticated to the image forming apparatus that has generated the request. Then, the processing ends.

Figure 12:
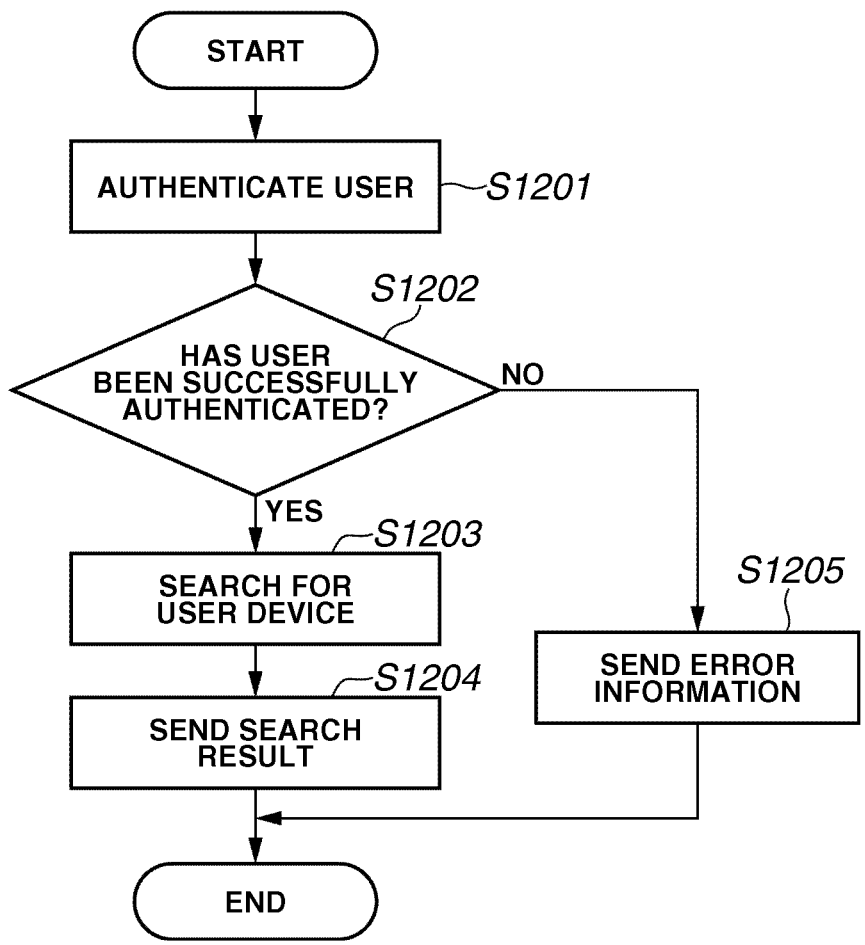
FIG. 12 is a flow chart illustrating an example of user device searching processing performed with a CPU of a server based on a control program according to an exemplary embodiment of the present invention.

FIG. 12 is a flow chart illustrating an example of user device searching processing performed with a CPU of a user device management server based on a control program according to an exemplary embodiment. In the present exemplary embodiment, the server 140 serves as the user device management server. When the image forming apparatus 110 generates a request for a list of user devices to the server 140 in step S1006 in FIG. 10, the user device searching processing is performed.

Referring to FIG. 12, in step S1201, the CPU 301 of the server 140 performs a user authentication based on the user authentication information included in the request for a list of user devices.

In step S1202, the CPU 301 determines whether the user has been successfully authenticated. If it is determined in step S1202 that the user has been successfully authenticated (YES in step S1202), then the CPU 301 advances to step S1203. On the other hand, if it is determined in step S1202 that the user has not been successfully authenticated (NO in step S1202), then the CPU 301 advances to step S1205.

In step S1203, the CPU 301 searches for a user device corresponding to the authenticated user from the database in the server 140. For example, in the case where the user A (FIG. 5) has been authenticated, the device α is searched for.

In step S1204, the CPU 301 sends information about the user device searched for in step S1203 to the image forming apparatus that has generated the request. Then, the processing ends. If no user device is detected in step S1203, the CPU 301 sends error information indicating that no user device has been detected to the image forming apparatus that has generated the request. Then, the processing ends.

In step S1205, the CPU 301 sends error information indicating that the user has not been successfully authenticated to the image forming apparatus that has generated the request. Then, the processing ends.

According to the above-described exemplary embodiment, in the case where the user A has generated an instruction for performing the processing flow in FIG. 6 via the image forming apparatus 110, the image forming apparatus 110 performs the scan task, the OCR task, and the send task. However, in this case, the device α, which is the user device for the user A, performs the print task.

Furthermore, if the user C has generated an instruction for performing the processing flow in FIG. 6 via the image forming apparatus 110, the print task is performed by the device β, which is the user device for the user B.

Suppose that the image forming apparatus 130 does not have a capacity for performing an OCR task and a send task. In this case, if the user A has generated an instruction for performing the processing flow in FIG. 6 via the image forming apparatus 130, the scan task is performed by the image forming apparatus 110 but the OCR task is performed by the device α, which is the user device for the user A.

As described above, an image forming apparatus that performs tasks included in the processing flow can be flexibly changed based on a user who performs the processing flow and an image forming apparatus that performs a task. Thus, an administrator can appropriately set a user device for each user and a processing flow to allow the users to share one processing flow.

Accordingly, in an image forming system, a user can flexibly define a setting such that tasks included in a processing flow can be appropriately performed without hindering a maintainability.

In the present exemplary embodiment, the server 140 serves as both a processing flow management server and a user device management server. However, different servers can be used for the processing flow management server and the user device management server. Furthermore, the functions of the server can be provided to the image forming apparatus 110.

The registration and editing of the processing flow managed by the server 140 can be performed with application software operating on the client 150. Alternatively, similar application software can be installed on the image forming apparatus 110 to perform the registration and editing of the processing flow managed by the server 140 with the application software on the image forming apparatus 110 by a user operation via the operation unit 111 of the image forming apparatus 110. Similarly, the setting of a user device can be performed with application software operating on the client 150, or alternatively, similar application software can be installed on the image forming apparatus 110 to perform the setting of a user device.

Moreover, a user can generate an instruction for performing a processing flow via a PC. In this case, the task whose setting includes a setting description "LOCAL" in the processing flow definition file may not be performed.

According to an exemplary embodiment, the processing flow can be performed by accessing an image forming apparatus on the network from a remote apparatus, in addition to a case where the processing flow is directly performed on a PC. In this case, the image forming apparatus that has been remotely accessed can be operated as an image forming apparatus via which the user has generated an instruction for performing the processing flow.

OTHER EXEMPLARY EMBODIMENTS

The present invention can also be achieved by providing a system or a device with a storage medium which stores software program code implementing the functions of the embodiments and by reading and executing the program code stored in the storage medium with a computer of the system or the device (a CPU or a micro processing unit (MPU)). In this case, the program code itself, which is read from the storage medium, implements the functions of the exemplary embodiments described above, and accordingly, the storage medium storing the program code constitutes the present invention.

The storage medium for supplying such program code includes a floppy disk, a hard disk, an optical disk, a magneto-optical disk (MO), a compact disc-read only memory (CD-ROM), a CD-recordable (CD-R), a digital versatile disc (DVD (DVD-recordable (DVD-R) and DVD-rewritable (DVD-RW)), a magnetic tape, a nonvolatile memory card, a ROM, and the like.

Moreover, the functions according to the exemplary embodiments described above can be implemented by the processing in which an operating system (OS) or the like operating on a computer carries out a part of or the whole of the actual processing based on an instruction given by the program code.

Furthermore, after the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-339864 filed Dec. 18, 2006, which is hereby incorporated by reference herein in its entirety.

What is claimed is:

1. A system for performing a processing flow based on a definition file which designates a plurality of tasks each of which can be performed by a function provided by an image forming apparatus and an order of performance of a plurality of tasks, wherein the system has a plurality of network devices including an image forming apparatuses, the system comprising:
an acquisition unit configured to acquire, as a function of one of the network devices, the definition file of the processing flow specified by a user;
a determination unit configured to select, as the function of one of the network devices, one of a plurality of the image forming apparatuses to perform each task included in the processing flow based on candidate information included in the definition file of the processing flow; and
a performing unit configured to perform each task included in the processing flow as a function of the image forming apparatus selected by the determination unit,
wherein the candidate information is set, as information for selecting an image forming apparatus that performs each task included in the processing flow, at least one of first information indicative of a user device corresponding to the user, second information indicative of an image forming apparatus having generated an instruction for performing the processing flow and third information indicative of an image forming apparatus specified by address information,
wherein, when the first information indicative of the user device is set as the candidate information of a print task included in the processing flow in the definition file, the determination unit selects the image forming apparatus set as the user device of the user which instructed for performing the processing flow based on the candidate information and the performing unit performs the print task in the image forming apparatus which is the user device selected by the determination unit,
wherein the candidate information further includes information on an order of priority for selecting an image forming apparatus that performs the task based on the first, second and third information, and
wherein each of the network devices has at least a CPU.

2. The system according to claim 1, wherein, in a case where a first image forming apparatus is set for a first user and a second image forming apparatus, which is different from the first image forming apparatus, is set for a second user, if the first user and the second user generate an instruction for performing a same processing flow and the user device is determined as the image forming apparatus that performs the task included in the processing flow by the determination unit, the performing unit performs the task using the first image forming apparatus as the user device for the first user and performs the task using the second image forming apparatus as the user device for the second user.

3. The system according to claim 1, further comprising:
a user information acquisition unit configured to acquire, as the function of one of the network devices, user information on the user;
a storage unit configured to store, as the function of one of the network devices, information on the user device; and
a detection unit configured to detect, as the function of one of the network devices, the user device for the user based on the user information acquired by the user information acquisition unit and the information stored in the storage unit,
wherein, if the first information indicative of the user device is set as the candidate information of the task included in the processing flow in the definition file, the performing unit performs the task in the image forming apparatus detected as the user device for the user by the detection unit.

4. The system according to claim 3, further comprising:
an authentication unit configured to authenticate, as the function of one of the network devices, a user based on the user information acquired by the user information acquisition unit; and
a display unit configured to display, as the function of one of the network devices, a display screen indicating a list of processing flows available to the user, based on user information on a user who is successfully authenticated by the authentication unit.

5. The system according to claim 1, wherein the plurality of tasks designated by the definition file include at least two of the following tasks: print task, scan task, facsimile transmission task, data transmission task, data reception task, data storage task, and data retrieval task.

6. A method for performing a processing flow based on a definition file which designates a plurality of tasks each of which can be performed by a function provided by an image forming apparatus and an order of performance of a plurality of tasks, the method comprising:
acquiring the definition file of the processing flow specified by a user;
selecting one of a plurality of image forming apparatuses to perform each task included in the processing flow based on candidate information included in the definition file of the processing flow; and
performing each task included in the processing flow using the image forming apparatus which is selected based on the information on one or more candidate image forming apparatuses,
wherein the candidate information is set, as information for selecting an image forming apparatus that performs each task included in the processing flow, at least one of first information indicative of a user device corresponding to the user, second information indicative of an image forming apparatus having generated an instruction for performing the processing flow and third information indicative of an image forming apparatus specified by address information, wherein, when the first information indicative of the user device is set as the candidate information of a print task included in the processing flow in the definition file, wherein the image forming apparatus, set as the user device of the user which instructed for performing the processing flow based on the candidate information, is selected, wherein the candidate information further includes information on an order of priority for selecting an image forming apparatus that performs the task based on the first, second and third information, and wherein the print task is performed in the image forming apparatus which is the user device selected.

7. The method according to claim 6, further comprising:

acquiring user information on the user;

storing information on the user device; and detecting the user device for the user based on the user information acquired and the information on the user device, wherein, if the first information indicative of the user device is set as the candidate information of the task included in the processing flow in the definition file, the task is performed in the image forming apparatus detected as the user device for the user.

8. The method according to claim 7, further comprising:

authenticating a user based on the user information; and displaying a display screen indicating a list of processing flows available to the user, based on user information on a user who is successfully authenticated.

* * * * *